United States Patent [19]

Tada

[11] Patent Number: 5,107,973
[45] Date of Patent: Apr. 28, 1992

[54] NON-STAGE TRANSMISSION

[76] Inventor: Hirofumi Tada, Higashizakura Building 606, 31-14, Izumi 3-chome, Higashi-ku, Nagoya-shi, Aichi-ken, Japan

[21] Appl. No.: 703,175

[22] Filed: May 20, 1991

[30] Foreign Application Priority Data

May 20, 1990 [JP] Japan .................... 2-130573

[51] Int. Cl.$^5$ .............................. F16D 31/04
[52] U.S. Cl. .................... 192/61; 74/730.1; 417/379; 60/407
[58] Field of Search ........ 74/730.1; 417/379; 60/407, 329; 192/61, 46

[56] References Cited

U.S. PATENT DOCUMENTS

| | | | |
|---|---|---|---|
| 2,155,740 | 4/1939 | Seibold | 192/4.8 |
| 2,244,929 | 6/1941 | Wall | 192/61 |
| 2,307,676 | 1/1943 | Harlan | 192/61 |
| 2,851,908 | 9/1958 | Nakamura | 192/61 |
| 3,780,841 | 12/1973 | Wells | 192/61 |

FOREIGN PATENT DOCUMENTS 1005113 6/1947 France .
178124 4/1921 United Kingdom .
615273 7/1946 United Kingdom .

*Primary Examiner*—Leslie A. Braun
*Assistant Examiner*—William O. Trousdell
*Attorney, Agent, or Firm*—Davis, BuJold & Streck

[57] ABSTRACT

A non-step transmission comprises a housing for storing hydraulic fluid therein, a driving shaft rotatably provided in the housing, a driven shaft rotatably provided in the housing in a coaxial position with the driving shaft, a first pump case rotatably provided about the driving shaft and having a fluid intake port and a fluid discharge port, a second pump case fixed on the housing, the second pump case encasing the driven shaft and having a fluid intake port and a fluid discharge port, an opening and closing mechanism for opening and closing the fluid intake port and the fluid discharge port, and gear pump mechanisms provided within the first and second pump cases, respectively. The simply constructed non-stage transmission can efficiently transmit a large torque from the driving shaft to the driven shaft.

6 Claims, 14 Drawing Sheets

NON-STAGE TRANSMISSION

BACKGROUND OF THE INVENTION

The present invention relates to a non-stage transmission which transmits rotation of a driving shaft to a driven shaft with stepless regulation.

Generally, various types of non-stage transmissions such as a mechanical transmission and a hydraulic power transmission have been used to suit various needs in a wide range of industries such as the automobile industry.

However, such conventional non-stage transmissions cannot successfully transmit a large torque and their structures tend to be complicated and large.

Wherefore, an object of the present invention made to overcome the above problems is to provide a simply constructed non-stage transmission which can efficiently transmit a large torque with a small torque loss caused by slippage.

Another object of the present invention is to provide a non-stage transmission which can automatically transmit large torque with a small torque loss.

Other objects and benefits of the invention will become apparent from the detailed description of the invention which follows hereinafter when taken in conjunction with the drawing figures which accompany it.

SUMMARY

A non-step transmission of the first feature of the invention made to overcome the above object comprises a housing for storing hydraulic fluid therein, a driving shaft and a driven shaft rotatably provided in the housing in a coaxial position, a first pump case rotatably provided about the driving shaft, the first pump case encasing the driving shaft and having at lease a pair of a fluid intake port and a fluid discharge port for allowing circulation of the hydraulic fluid through the first pump case, and being fixed on the driven shaft, a second pump case fixed on the housing and opposed to the first pump case, the second pump case encasing the driven shaft and having at least a pair of fluid intake port and a fluid discharge port for allowing circulation of the hydraulic fluid through the second pump case, an opening and closing mechanism for opening and closing the fluid intake ports and the fluid discharge ports, and gear pump mechanisms provided within the first and the second pump cases, respectively.

In operation, when the opening and closing mechanism completely closes the fluid intake port and the fluid discharge port of the second pump case of the driven shaft side and completely opens the fluid intake port and the fluid discharge port of the first pump case of the driving shaft side, the driven shaft does not rotate while the driving shaft rotates at no load.

When the opening and closing mechanism partly opens the fluid intake ports and the fluid discharge ports of the first and the second pump cases, part of the torque of the driving shaft is transmitted to the driven shaft.

When the opening and closing mechanism completely opens the fluid intake port and the fluid discharge port of the second pump case of the driven shaft side and completely closes the fluid intake port and the fluid discharge port of the first pump case of the driving shaft side, all the torque of the driving shaft is transmitted to the driven shaft.

The second feature of the invention is a non-stage transmission that comprises a housing for storing hydraulic fluid therein, a driving shaft provided in the housing, a driven shaft provided in the housing in a coaxial position with driving shaft, a first pump case provided on the driving shaft, the first pump case encasing a portion of the driven shaft and having fluid intake ports and a fluid discharge port for allowing circulation of the hydraulic fluid through the first pump case, a second pump case fixed on the housing and opposed to the first pump case, the second pump case encasing a portion of the driven shaft and having fluid intake ports and a fluid discharge port for allowing circulation of the hydraulic fluid through the second pump case, an automatic fluid circulation regulation mechanism for automatically regulating the circulation of the hydraulic fluid through the fluid intake port and the fluid discharge port by closing at least one port of the fluid discharge port and the fluid intake ports of the second pump case and opening at least one port of the fluid discharge port and the fluid intake ports of the first pump case, and gear pump mechanisms provided within the first and the second pump cases, respectively.

In operation, while the fluid discharge port of the first pump case is fully open at its maximum fluid passage area, the fluid discharge port of the second pump case is closed at the minimum fluid passage area. When the driving shaft rotates at a low speed, the hydraulic fluid merely circulates through the first pump case and the housing. Therefore, the driven gear is subject to no torque to rotate thereof.

When the driving shaft rotates at a higher speed, the pump pressure within the first pump case increases to rotate the driven shaft and activate the second gear pump mechanism. Eventually, the pump pressure within the second gear pump mechanism corresponding to the rotating speed of the driving shaft occurs, activates the automatic fluid circulation regulation mechanism. Then, the automatic fluid circulation regulation mechanism gradually opens the fluid discharge port of the second pump case to increase the fluid passage area thereof, and at the same time gradually closes the fluid discharge port of the first pump case to decrease the fluid passage area thereof. Consequently, the rotating speed of the driven shaft approaches that of the driving shaft until the driven shaft rotates at the same speed as the driving shaft when the fluid discharge port of the first pump case is completely closed at the minimum fluid passage area.

BRIEF EXPLANATION OF THE ATTACHED DRAWINGS

EMBODIMENTS

Preferred embodiments of the present invention will now be explained with FIGS. 1-13, in which thick arrows denote rotational directions of shafts and thin arrows denote directions of oil flow while broken-line arrows denote rotational direction of gears.

First Embodiment

Figure 1A:
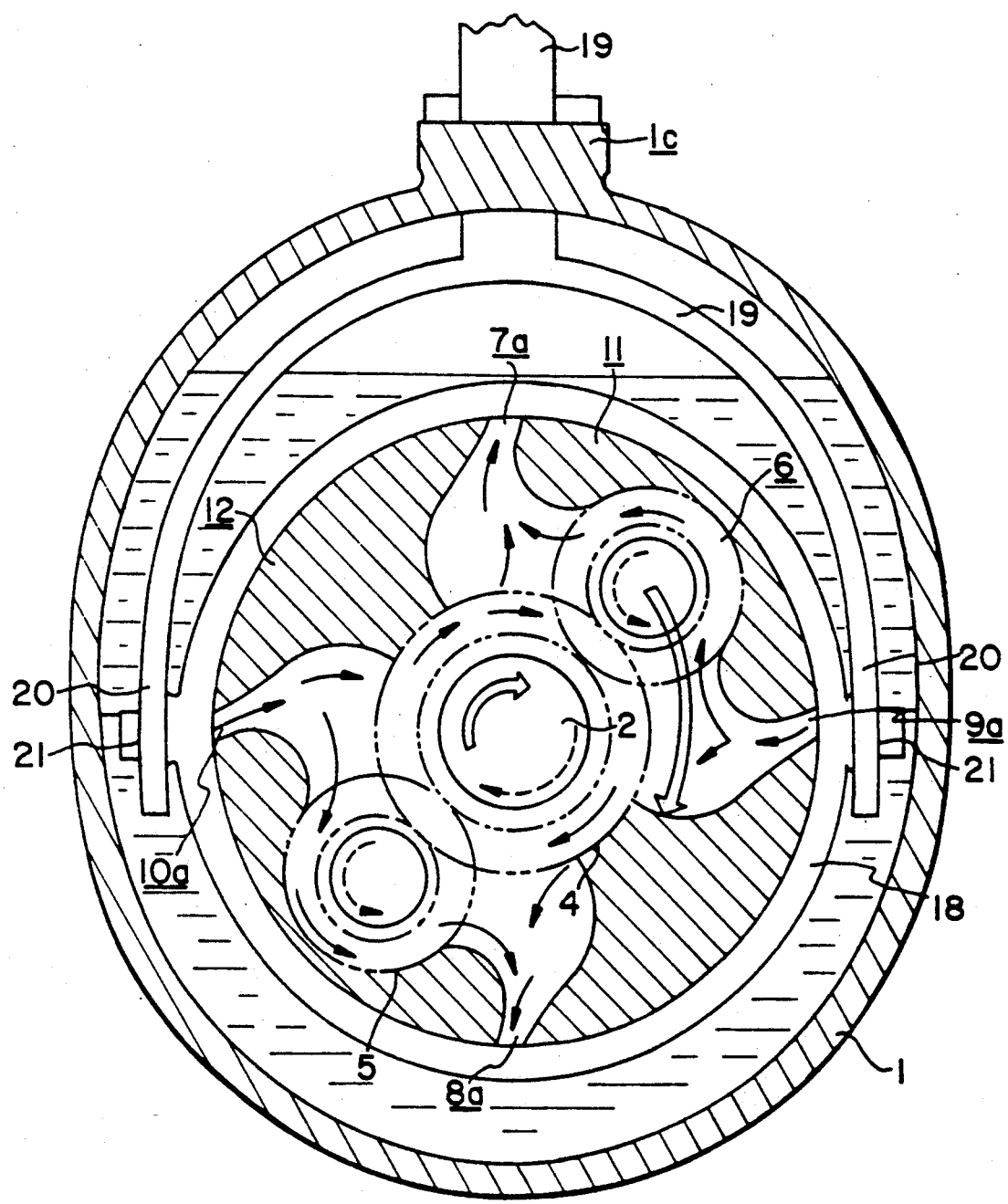
FIG. 1A is an elevation view of a non-stage transmission of a first embodiment according to the present invention in cross section taken on line IA—IA of FIG. 3.
Figure 1B:
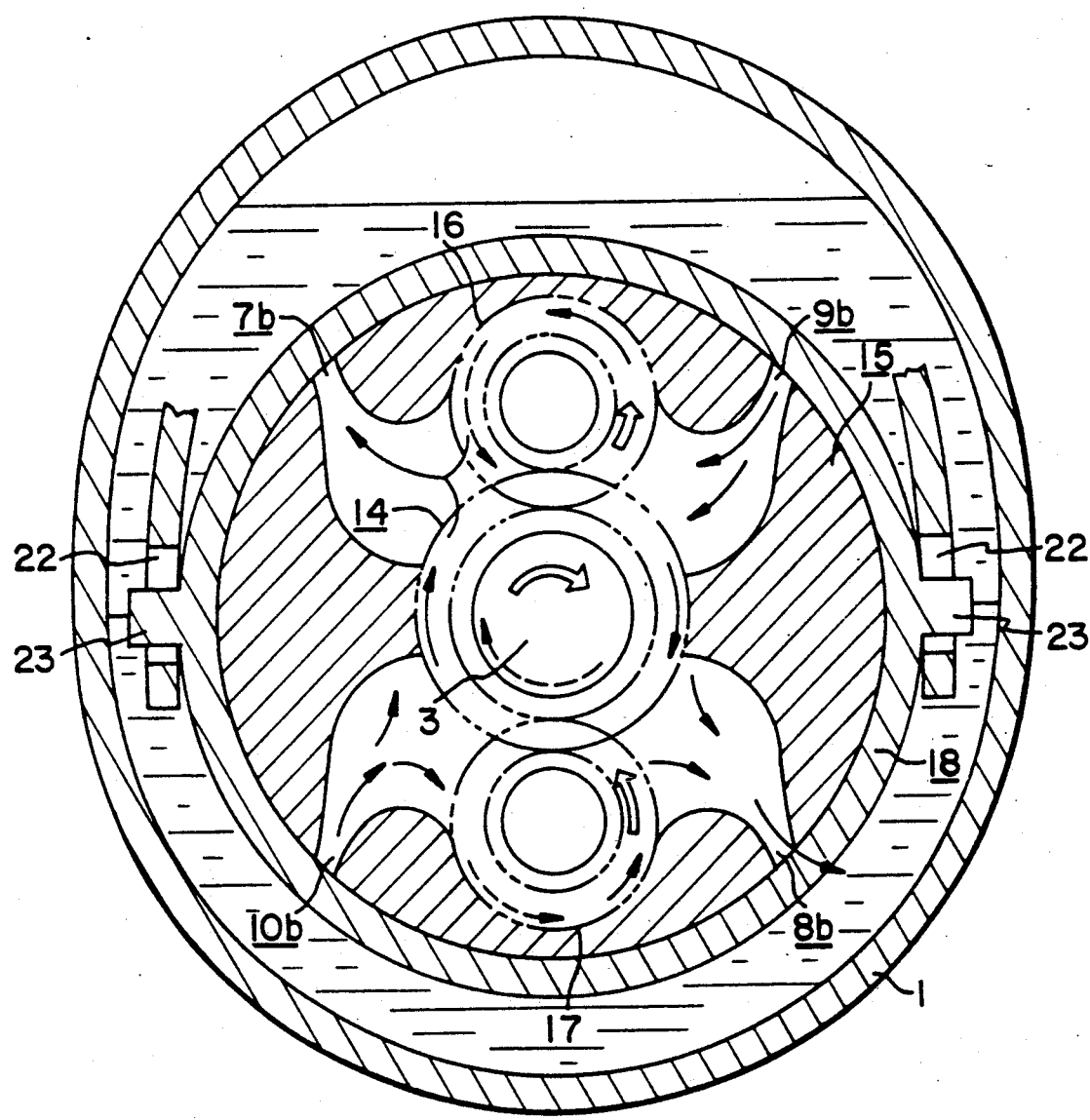
FIG. 1B is a cross sectional view of the first embodiment taken on line IB—IB of FIG. 3.

A first embodiment of the invention will now be explained with reference to FIGS. 1-3. A driving shaft 2 is rotatably installed via a bearing 2a in a front wall 1a of a housing 1, which has a cylindrical shape with both of the ends closed. A driven shaft 3 is installed in a rear wall 1b via a bearing 3a such that the driven shaft 3 is coaxial with the driving shaft 2. Within the housing 1, the driving shaft 2 is encased by a first pump case 11 whose front wall 11a is rotatably provided about the driving shaft 2 via a not shown seal. A rear wall 11b of the pump case 11 has a projection 11c in the center thereof, which is fixed on the driven shaft 3 such that the first pump case 11 rotates with the driven shaft 3. The driven shaft 3 is encased by a second pump case 15 whose front wall 15a is in relatively rotatable touch with the driven shaft 3 via a not-shown seal and opposed to the rear wall 11b of the first pump case 11. The rear end of the second pump case 15 is fixed on the rear wall 1b of the housing 1. The first and the second pump cases 11 and 15 have the same diameter in cross section and are coaxially positioned.

The periphery of the driving shaft 2 is provided with a driving gear 4 and two driven gears 5 and 6, which are engaged with the driving gear 4, are rotatably installed in the first pump case 11. The driven gears 5 and 6 are symmetrically positioned with each other about the driving shaft 2. The driving gear 4 and the driven gears 5 and 6 compose a first gear pump mechanism 12. Likewise, the periphery of the driven shaft 3 is provided with a driving gear 14 and two driven gears 16 and 17, which are engaged with the driving gear 14, are rotatably installed in the second pump case 15. The driven gears 16 and 17 are symmetrically positioned with each other about the driven shaft 3. The driving gear 14 and the driven gears 16 and 17 compose a second gear pump mechanism 13.

The housing 1 is filled with hydraulic fluid such as oil 24 and the first pump case 11 is provided with fluid discharge ports 7a and 8a symmetrically positioned with each other about the driving shaft 2 and fluid intake ports 9a and 10a also symmetrically positioned with each other about the driving shaft 2. Likewise, the second pump case 15 is provided with fluid discharge ports 7b and 8b symmetrically positioned with each other about the driven shaft 3 and fluid intake ports 9b and 10b also symmetrically positioned with each other about the driven shaft 3. Through the fluid discharge ports 7a, 7b, 8a, and 8b and the fluid intake ports 9a, 9b, 10a, and 10b, the oil 24 is allowed to circulate through the first and the second pump cases 11 and 15. A hydraulic fluid circulation regulation ring (hereinafter ring) is slidably provided on the peripheries of the first and the second pump cases 11 and 15.

A lever 19 is installed on a boss 1c provided on the upper end of the housing 1 via a pin 20 in such a manner that the lever can pivot on the pin 20. The lever liquid-tightly penetrates the housing 1 via an O-ring 21 and forms a fork 19a inside the housing 1. The ends of the fork 19a are provided with slots 22 that pins 23 projecting from the ring 18 slidably penetrate. Therefore, the lever 19, when pivoting on the pin 20, causes the ring 18 to slide along the first and the second pump cases 11 and 15 to gradually change the state of the fluid discharge ports 7a, 7b, 8a, and 8b and the fluid discharge ports 9a, 9b, 10a, and 10b from fully open, partly open to completely closed.

The first gear pump mechanism 12 of the driving shaft side, thus constructed as explained above, functions as a non-stage transmission while the second gear pump mechanism 13 of the driven gear side functions as a brake.

Figure 2:
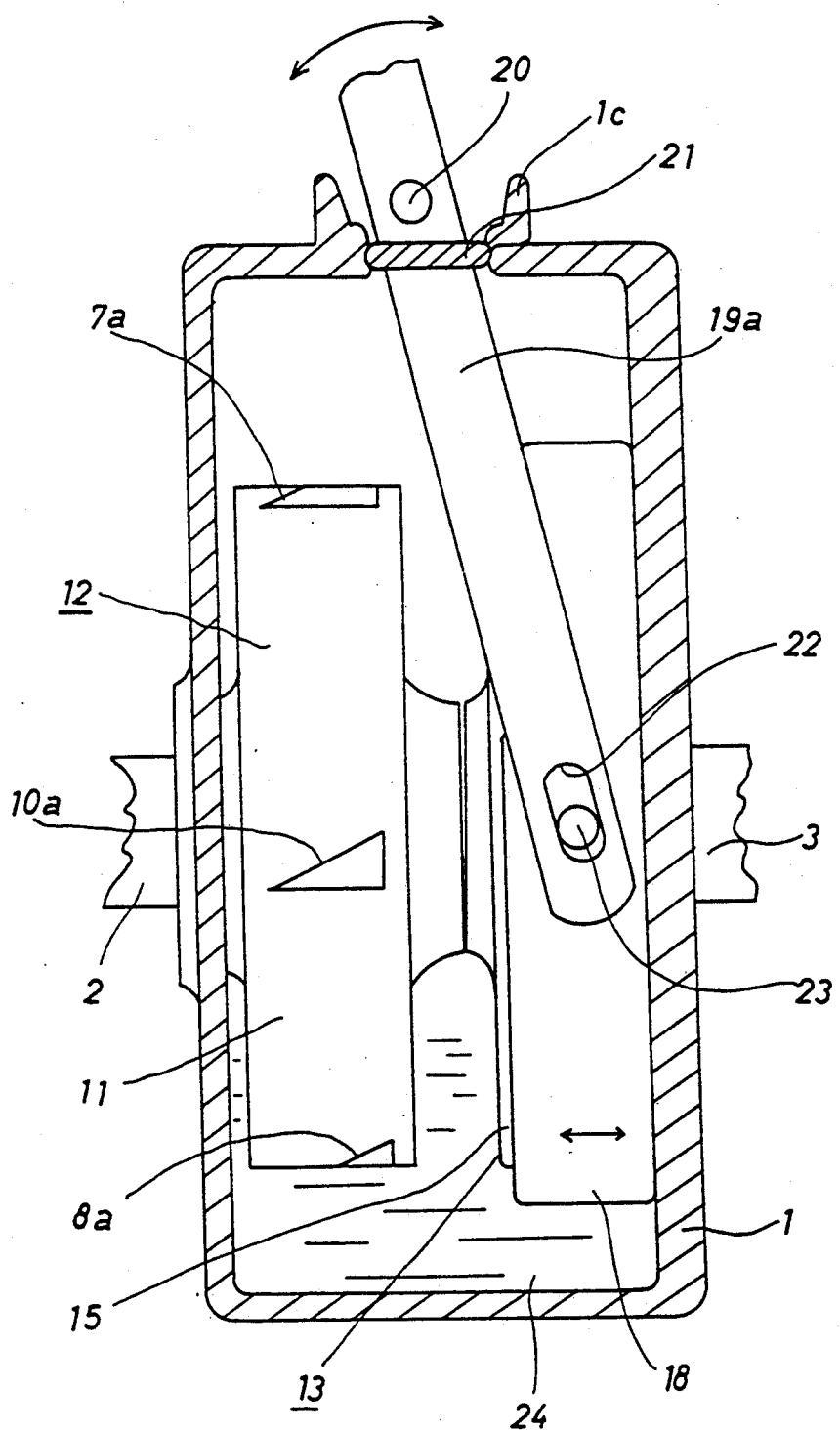
FIG. 2 is a partly cross sectional view of the first embodiment.
Figure 3:
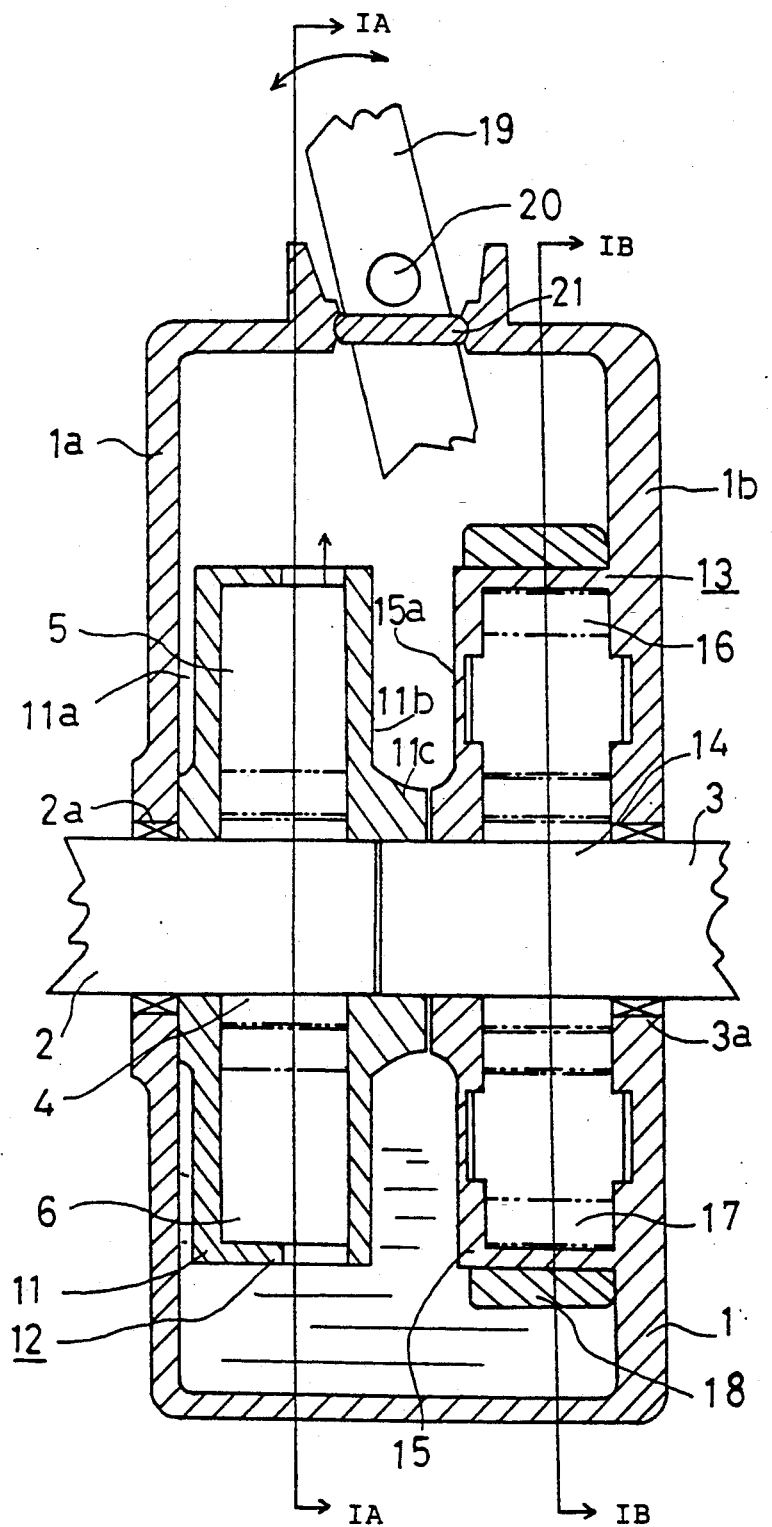
FIG. 3 is a cross sectional view of the first embodiment.

As shown in FIG. 2, when the ring 18 completely closes the fluid discharge ports 7b and 8b and the fluid intake ports 9b and 10b of the second gear pump mechanism 13 of the driven shaft side, the driven gear 14 cannot rotate because there is no oil circulation through the second pump case 15 to allow rotation of the driven gears 16 and 17. The second pump case 15, fixed on the housing 1, does not rotate with the driven gears 16 and 17. In other words, the second gear pump mechanism 13 is braked in effect. Meanwhile, the fluid discharge ports 7a and 8a and the fluid discharge ports 9a and 10a of the first gear pump mechanism 12 are fully open at the maximum fluid passage area to obtain maximum fluid circulation. Accordingly, rotation of the driving shaft 2 causes the driven gears 5 and 6 of the first gear pump mechanism 12 to rotate with the driving shaft 2 with no load, hence circulating the oil 24 without transmitting any torque to the first pump case 11. The driven shaft 3 connected to the first pump case 11 remains stationary with no torque applied thereto from the driving shaft 2.

When the lever 19 pivots to cause the ring 18 to partly close the fluid discharge ports 7a and 8a and the fluid intake ports 9a and 10a of the first gear pump mechanism 12 of the driving shaft side, the fluid intake ports 7b and 8b and the fluid intake ports 9b and 10b of the second gear pump mechanism 13 of the driven shaft side are partly opened. In this state, the second gear pump mechanism 13 restores its function as a pump and the brake on the driven gear 14 is released.

At the same time, because the fluid passage area of the first gear pump mechanism 12 of the driving shaft side is reduced by the slide of the ring 18, the driven gears 5 and 6 receive a load, which creates torque to rotate the first pump case 11 and, subsequently, the driven shaft 3. The rotating speed of the driven shaft 3 is lower than that of the driving shaft 2, and is equal to the reduced rotating speed of the driven gears 5 and 6.

Next, the ring 18 is slid further by the pivot of the lever 19 to completely close the fluid discharge ports 7a and 8a and the fluid intake ports 9a and 10a of the first pump case 11. Because there is no fluid circulation through the first pump case 11, the driven gears 5 and 6 cannot rotate and the first gear pump mechanism 12 is locked. This causes the first pump case 11 to rotate with the driving shaft 2 and the driven gears 5 and 6, thereby transmitting the torque of the driving shaft 2 to the driven shaft 3. On the other hand, the fluid discharge ports 7b and 8b and the fluid intake ports 9b and 10b of the second pump case 15 are completely open to allow the driven shaft 3 to be easily rotated by the driving shaft 2 at the same rotating speed as that of the driving shaft 2.

As explained above, the torque transmitted by the driving shaft 2 to the driven shaft 3 can be steplessly changed by actuating the ring 18 to control the state of the fluid discharge ports 7a, 7b, 8a, and 8b and the fluid intake ports 9a, 9b, 10a, and 10b of the first and second pump mechanisms 11 and 13.

Second Embodiment

A second embodiment of the present invention will be hereinafter explained with specific reference to FIGS. 4–14.

A driving shaft 32 and a driven shaft 33 are co-axially installed in a housing 31 of a non-stage transmission 30 of the second embodiment. Within the housing 31, a portion of the driven shaft 33 near the end thereof is encased by a first pump case 34 and another portion of the driven shaft 33 near the rear of the housing 31 is also encased by a second pump case 41 fixed on the rear of the housing 31.

The periphery of the driven shaft 33 within the first pump case 34 is provided with a driving gear 37, which is engaged with two driven gears 35 and 36 rotatably installed in the first pump case 34. The driving gear 37 and the driven gears 35 and 36 compose a first gear pump mechanism 38. Likewise, the periphery of the driven shaft 33 within the second pump case 41 is provided with a driving gear 40, which is engaged with two driven gears 42 and 43 rotatably provided in the second pump case 41. The driving gear 40 and the driven gears 42 and 43 compose a second pump gear mechanism 44.

The housing 31 is filled with hydraulic fluid such as oil 39. The first pump case 34 is provided with fluid intake ports 47 and a fluid discharge port 48 for circulating the oil 39 therethrough. The second pump case 41 is also provided with fluid intake ports 45 and a fluid discharge port 46 for circulating the oil 39 therethrough. A sleeve valve 49 is slidably mounted on the periphery of the second pump case 41. A pin 51 provided in the housing 31 is engaged with the groove 50 provided in the sleeve valve 49 so that the sleeve valve 49 is prevented from rotating in the circumferential direction thereof. Interposed between the first and the second pump cases 34 and 41 is a spring 52 for pushing the sleeve valve 49 toward the second pump case 41, hence either completely closing or leaving open a predetermined minimum area of the fluid discharge port 46 of the second pump case 41. When allowed to slide onto the first pump case 34 against the force of the spring 52, the sleeve valve 49 partly or completely closes the fluid discharge port 48 of the first pump case 34.

In FIGS. 4–13 as applicable, 53 denotes flow regulation holes 53 provided in the fluid discharge port 48 the first pump case 34 and in the area of sleeve valve 49 that is opposed to the fluid discharge port 46. 54 is a check valve provided on the discharge side passage of the first pump case 34. 55 and 56 denote bearings and oil seals, respectively. Other not-shown bearings and oil seals are provided in the non-stage transmission where necessary.

Figure 4:
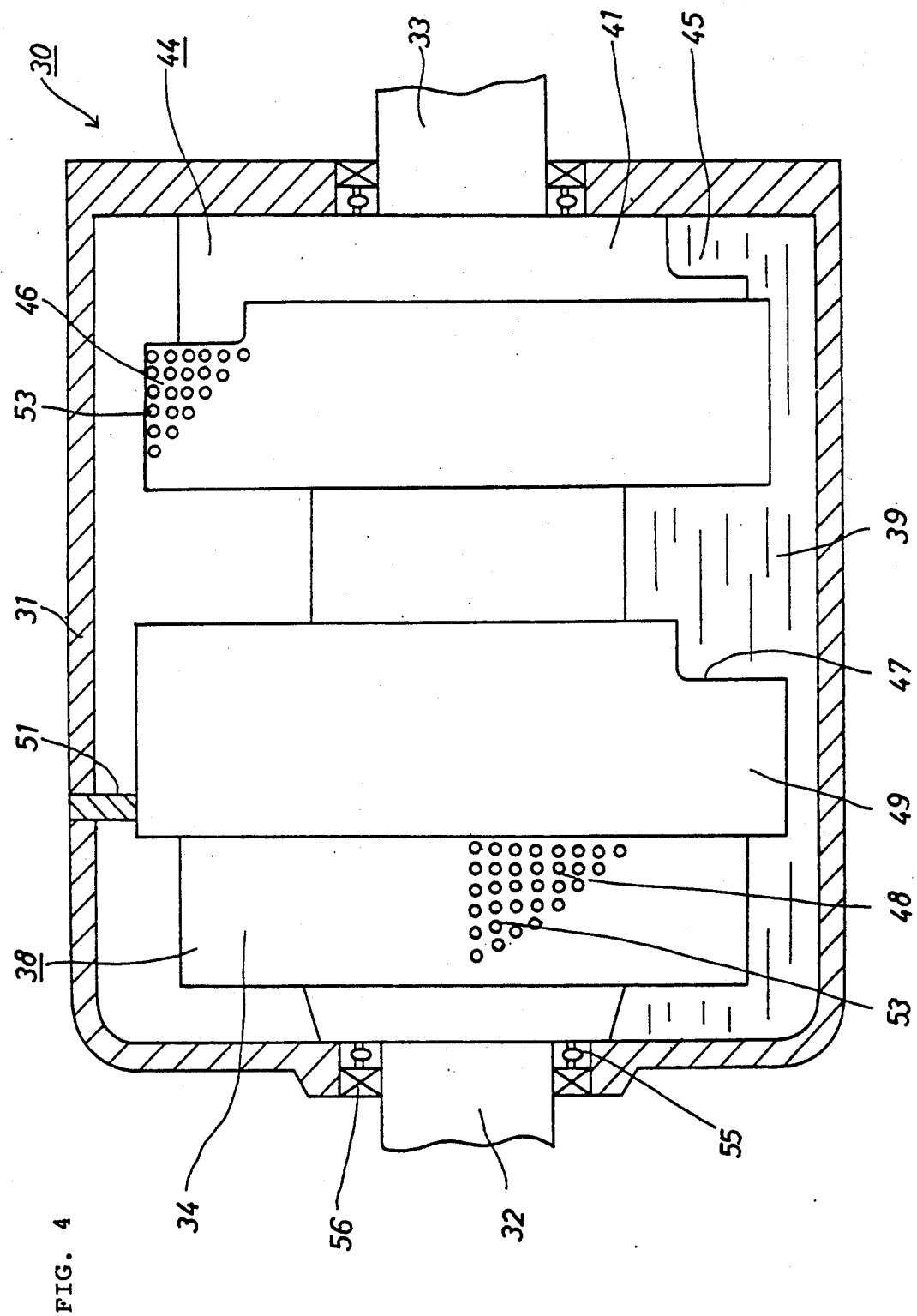
FIG. 4 is a non-stage transmission of a second embodiment of the present invention in the inoperative state partly in cross section.
Figure 5:
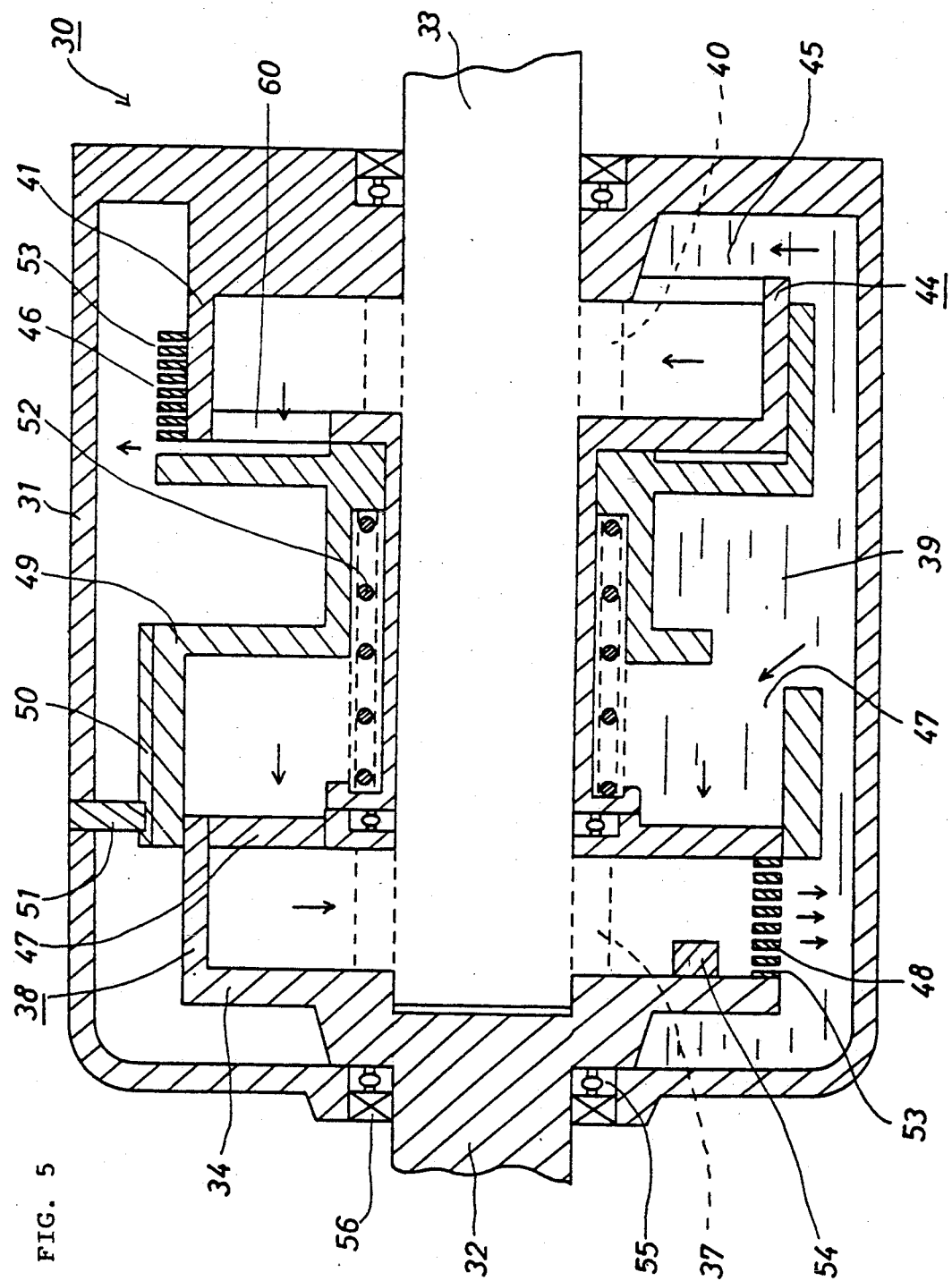
FIG. 5 is a combination of a cross sectional view of FIG. 12 taken on the lines V-R—V-R and a cross sectional view of FIG. 10 taken on the lines V-L—V-L in the inoperative state of the non-stage transmission of the second embodiment.
Figure 6:
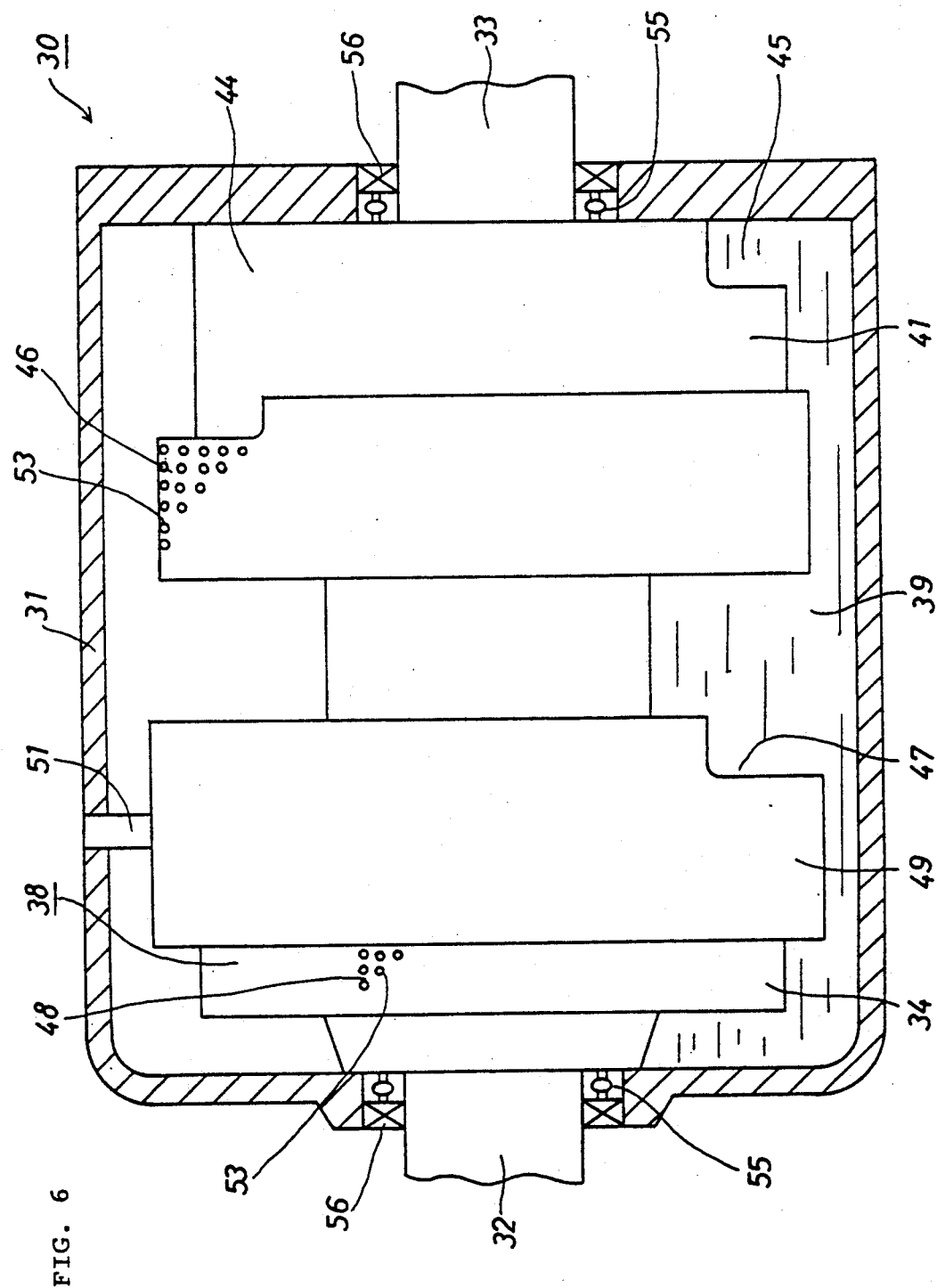
FIG. 6 is a partly cross sectional view of the second embodiment in a medium operative state.
Figure 7:
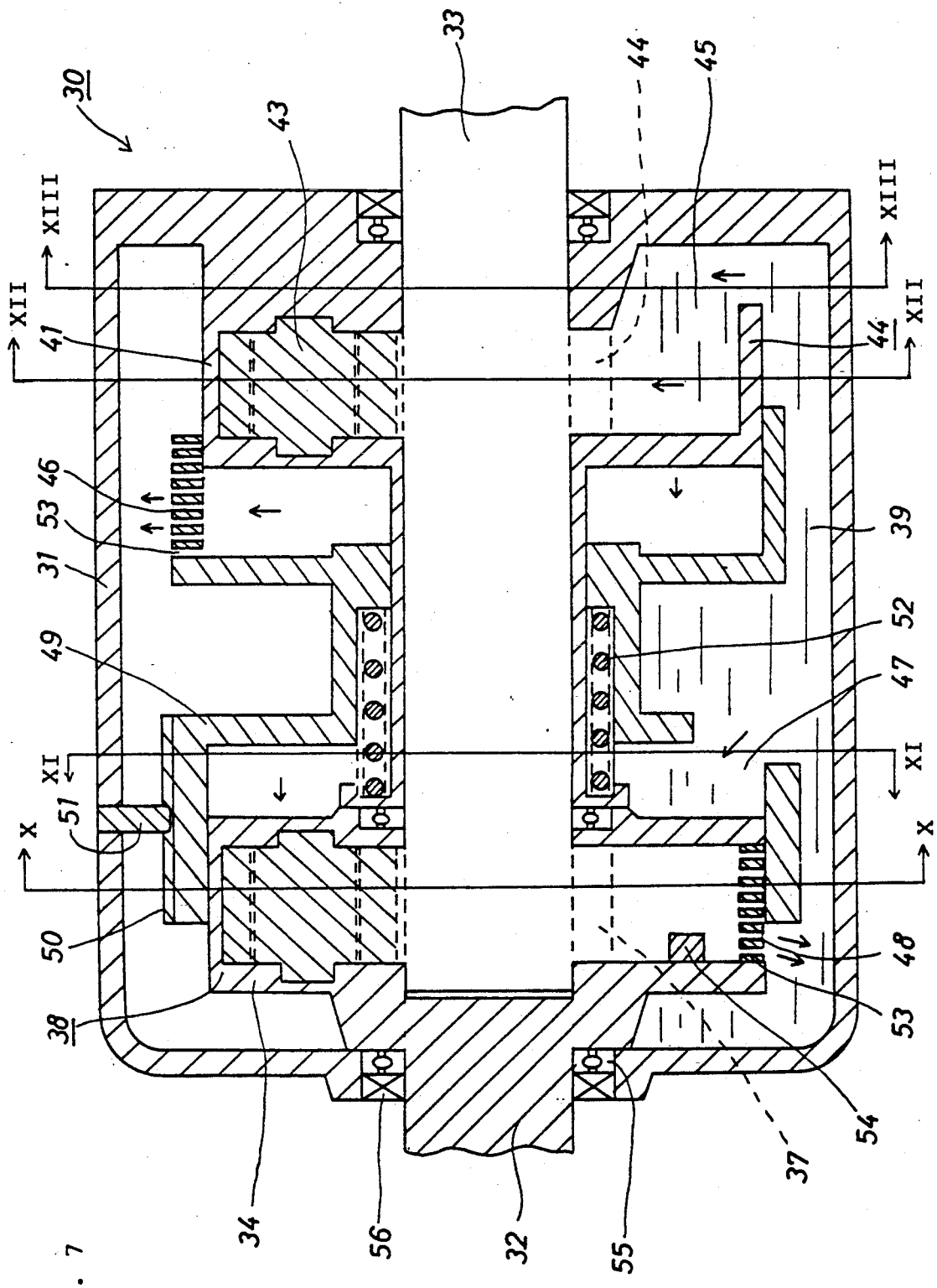
FIG. 7 is a combination of a cross sectional view of FIG. 10 taken on the lines VII-L—VII-L and a cross sectional view of FIG. 12 taken on the lines VII-R—VII-R in the medium operative state.
Figure 8:
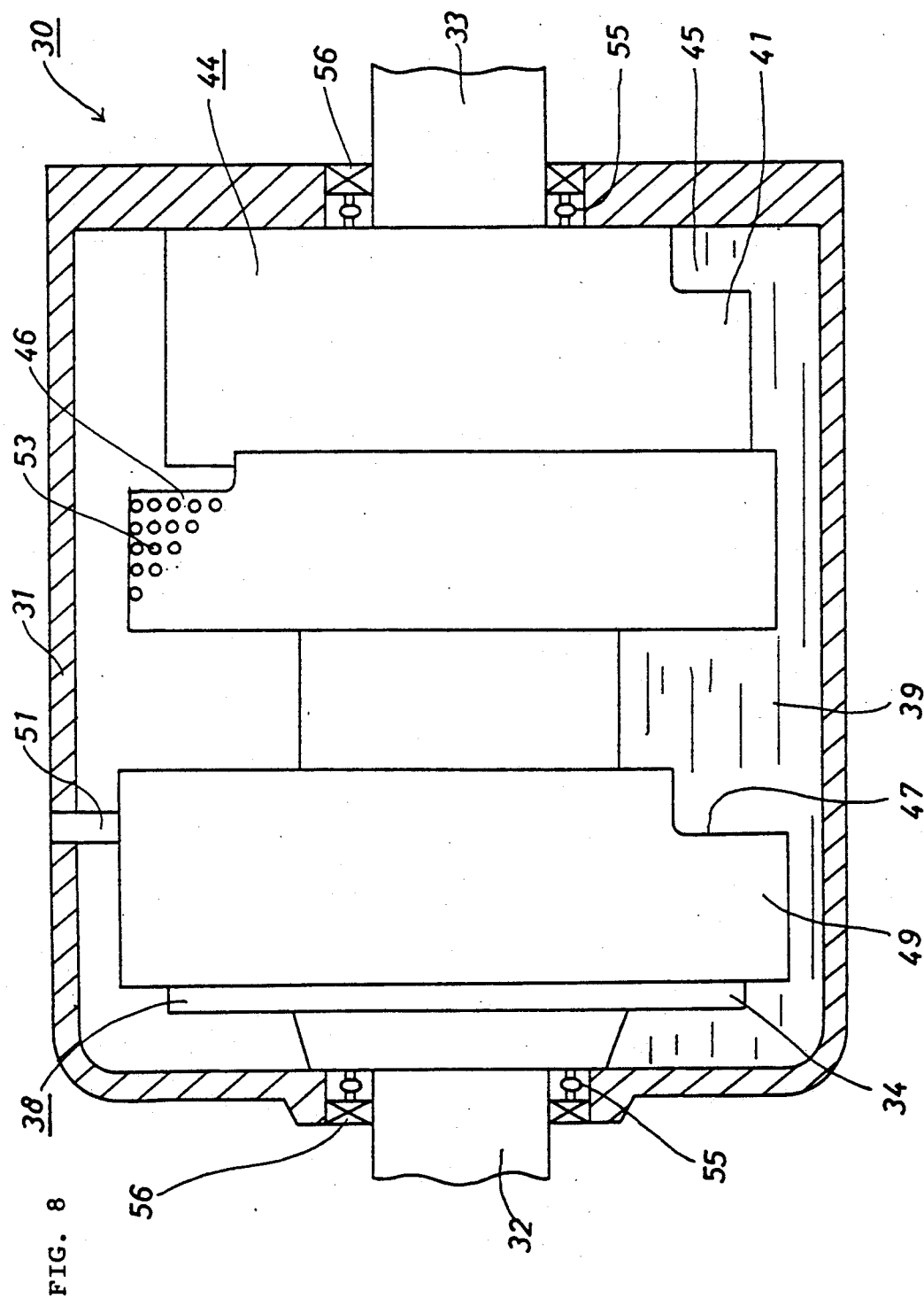
FIG. 8 is a partly cross sectional view of the non-stage transmission of the second embodiment in the maximum operative state.
Figure 9:
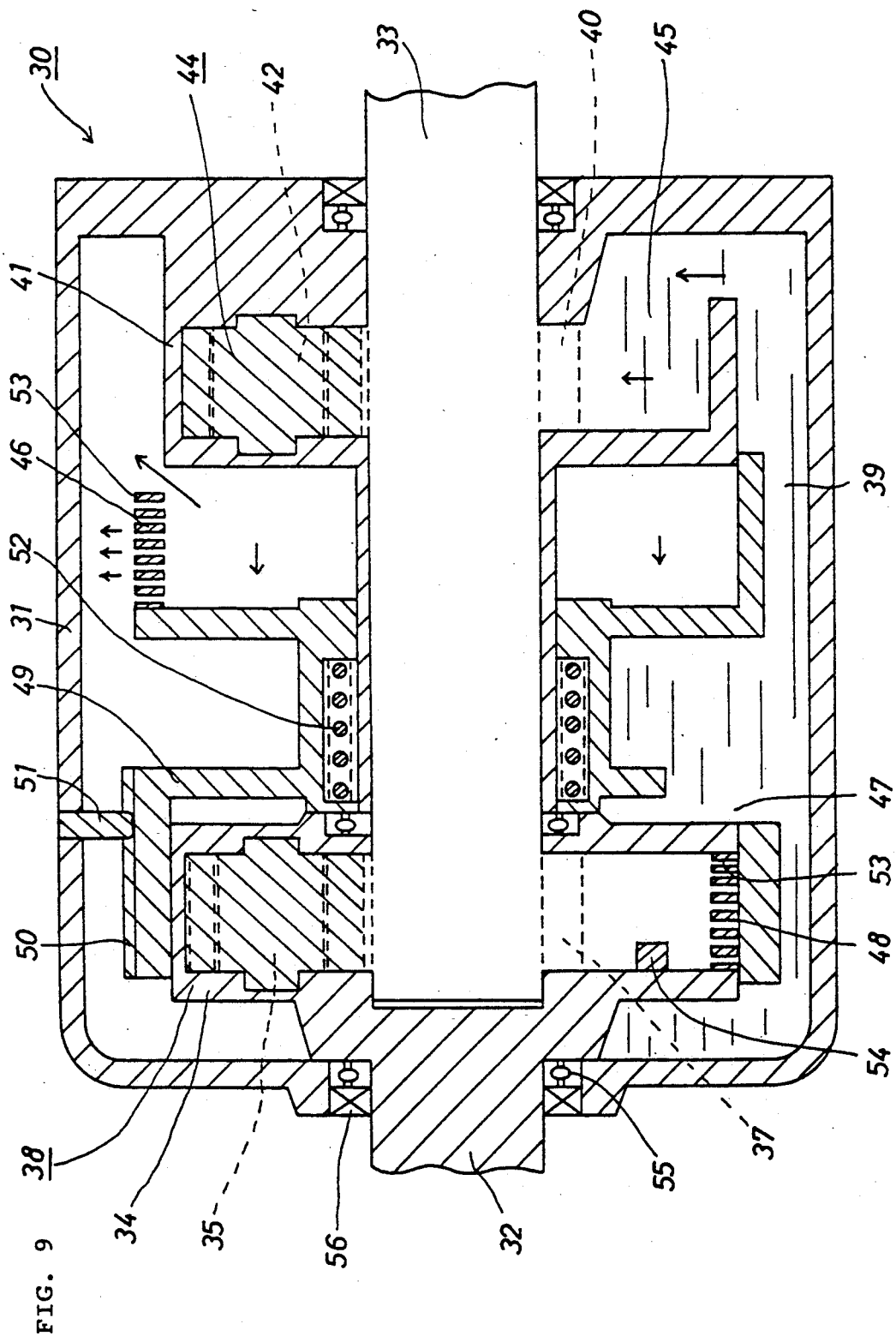
FIG. 9 is a combination of a cross sectional view of FIG. 10 taken on the lines VII-L—VII-L and a cross sectional view of FIG. 12 taken on the lines VII-R—VII-R in the maximum operative stage of the non-stage transmission.
Figure 10:
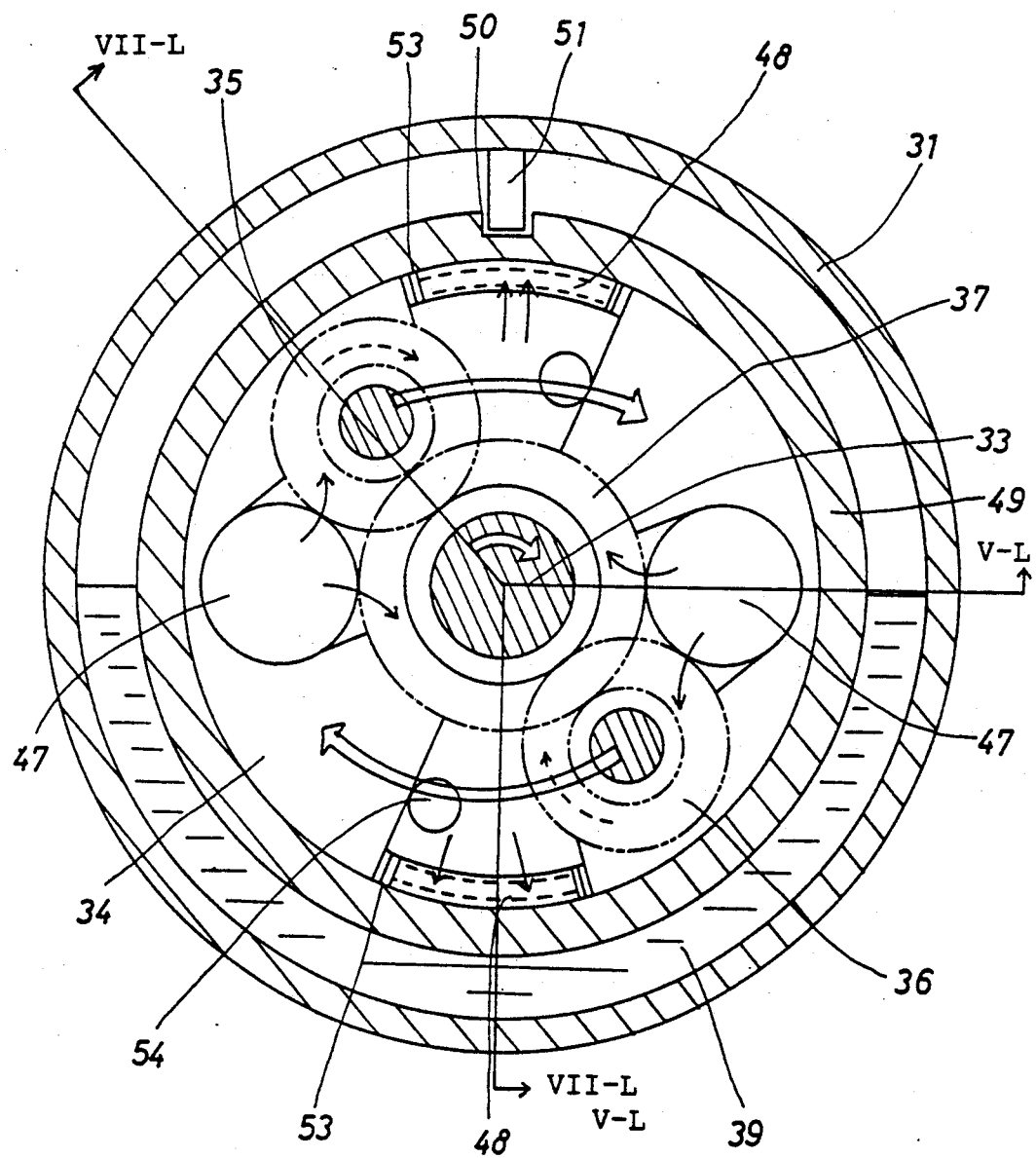
FIG. 10 is a cross sectional view of FIG. 7 taken on line X—X.
Figure 11:
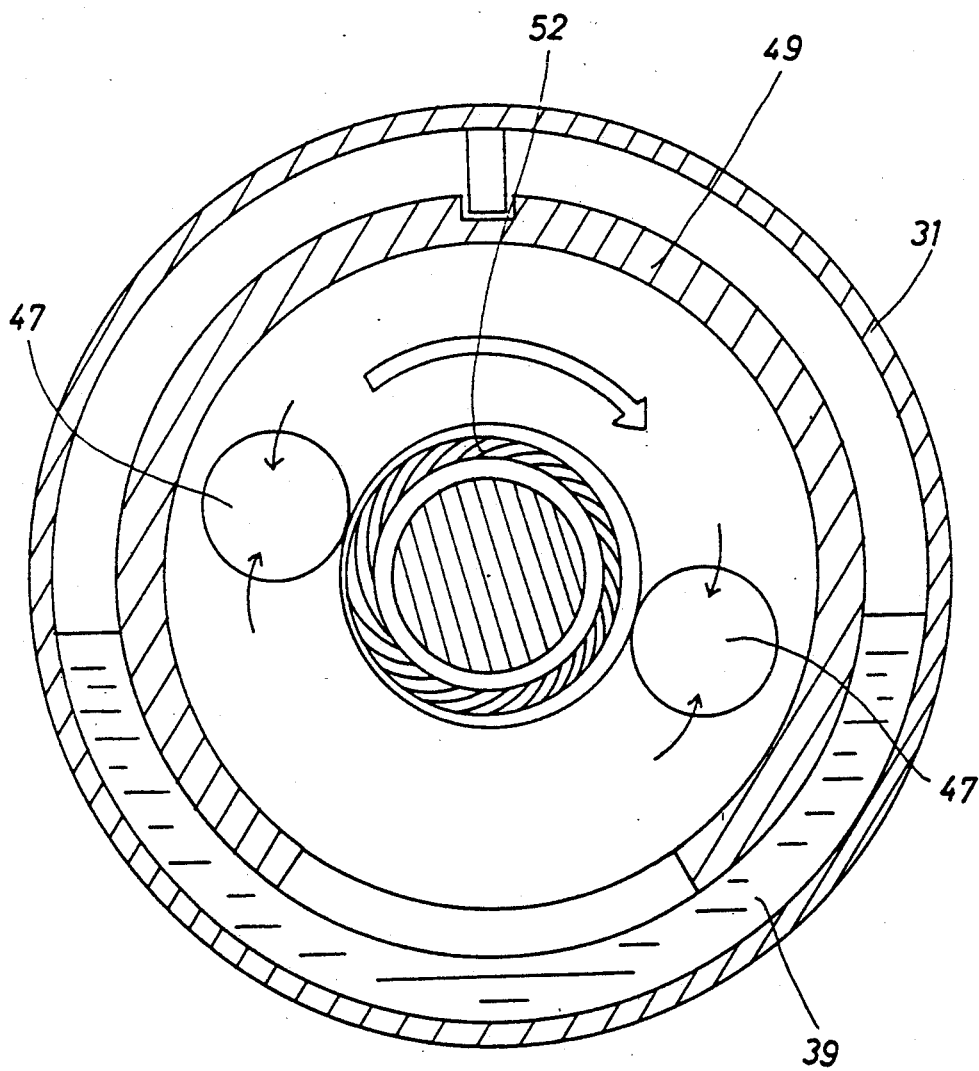
FIG. 11 is a cross sectional view of FIG. 7 taken on line XI—XI.
Figure 12:
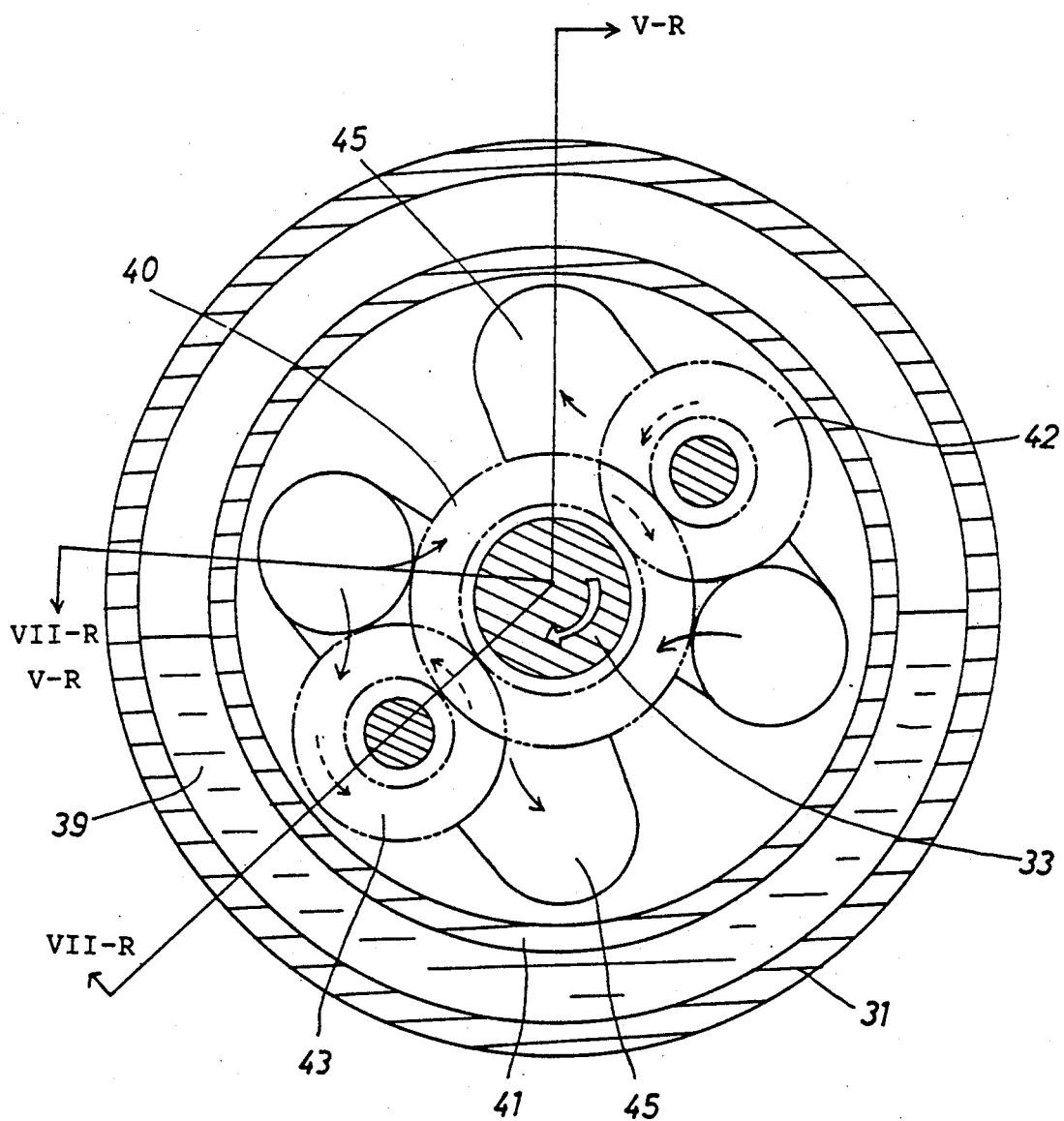
FIG. 12 is a cross sectional view of FIG. 7 taken on line XII—XII.
Figure 13:
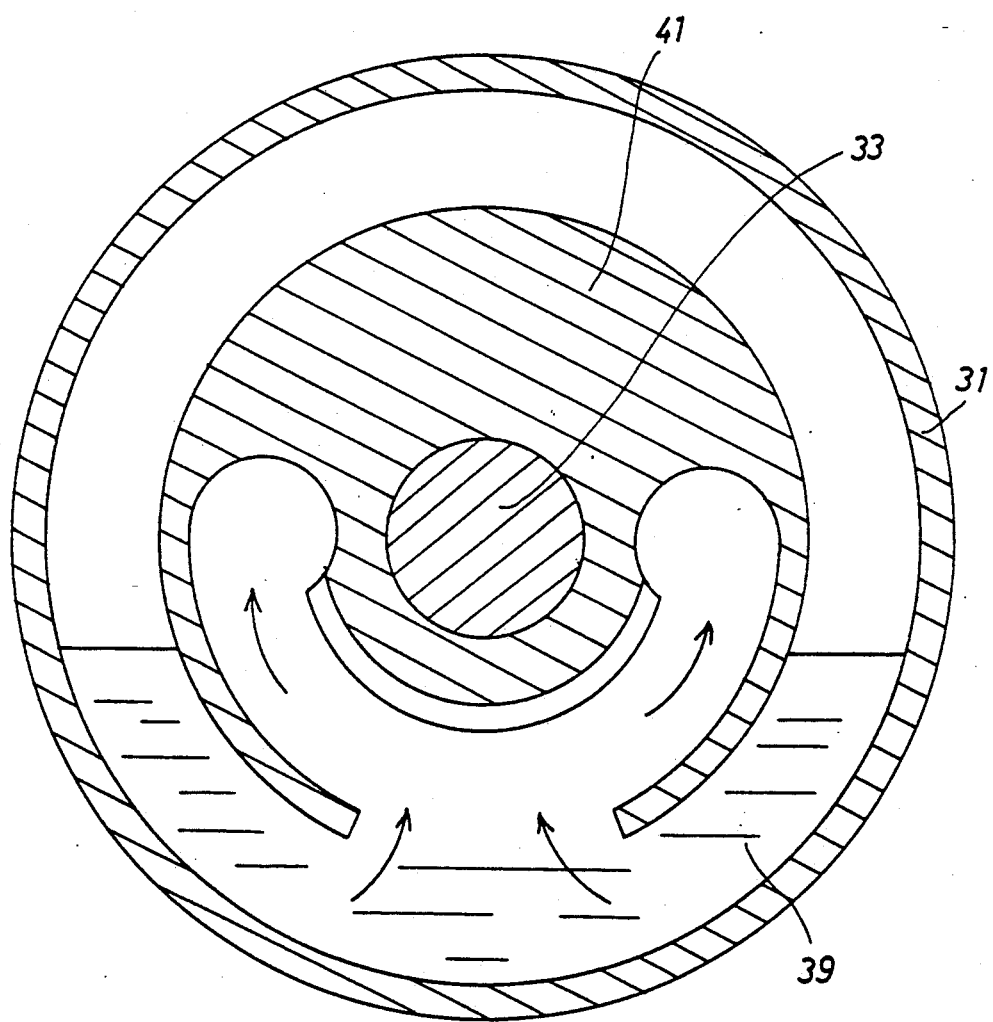
FIG. 13 is a cross sectional view of FIG. 7 taken on line XIII—XIII.

In operation, as shown in FIG. 4 and 5, when the driving shaft 32 slowly rotates in an operative state, the oil 39 filled in the housing 31 merely circulates through the first gear pump mechanism 38 and the housing 31 without transmitting a torque to the driven shaft 33. In this stage, the driving gear 40 does not rotate.

Next, when the driving shaft 32 obtains a higher rotating speed, the pressure inside the first gear pump mechanism 38 increases to rotate the driven shaft 33 and to operate the second gear pump mechanism 44. Then, the oil pressure corresponding to the rotating speed of the driving shaft 32 occurs inside the second gear pump mechanism 44, which causes the sleeve valve 49 to slide toward the driving shaft 32 against the force of the spring 52. This increases the fluid passage area of the fluid discharge port 46 of the second gear pump mechanism 44 and decreases the fluid passage area of the fluid discharge port 48 of the first gear pump mechanism 38. As a result, the rotating speed of the driven shaft 33 gradually approaches that of the rotating speed of the driving shaft 32 until both the driving shaft 32 and the driven shaft 33 rotate at the same rotating speed when the fluid discharge port 48 of the first gear pump mechanism 38 is completely closed.

In the event that a torque is applied by the driven shaft 33 when the non-stage transmission 30 is not operational or when the driven shaft 33 is subject to a load, the first gear pump mechanism 38 is made operational at no load by the check valve 54 taking in oil 39 from the discharge side.

Since there may be many modifications with out departing from the scope of the invention, the embodiments above are not intended to limit the invention to the disclosed embodiments; but, is intended to illustrate the invention more clearly.

What is claimed is:

1. A non-step transmission comprises:
   a housing for storing hydraulic fluid therein;
   a driving shaft rotatably provided in the housing;
   a driven shaft rotatably provided in the housing in a coaxial position with the driving shaft;
   a first pump case rotatably provided about the driving shaft, the first pump case encasing the driving shaft, having at least a pair of a fluid intake port and a fluid discharge port for allowing circulation of the hydraulic fluid through the first pump case, and being fixed on the driven shaft;
   a second pump case fixed on the housing and opposed to the first pump case, the second pump case encasing the driven shaft and having at least a pair of fluid intake port and a fluid discharge port for allowing circulation of the hydraulic fluid through the second pump case;

an opening and closing mechanism for opening and closing the fluid intake ports and the fluid discharge ports; and gear pump mechanisms provided within the first and the second pump cases, respectively.

2. The non-stage transmission of claim 1, in which the opening and closing mechanism for opening and closing the fluid intake ports and the fluid discharge ports of the first and the second pump cases comprises:

a hydraulic fluid circulation regulation ring slidably provided on the peripheries of the first and the second pump cases; and a sliding mechanism for sliding the hydraulic fluid circulation regulation ring.

3. The non-stage transmission of claim 2, in which the sliding mechanism for sliding the hydraulic fluid circulation regulation ring comprises:

pins projecting from the peripheries of the hydraulic fluid circulation regulation ring, the pins being positioned symmetrically about the center of the hydraulic fluid regulation ring; and a lever engaged with the pins via slots provided in the ends thereof and supported by the housing such that the lever can pivot.

4. The non-stage transmission of claim 1, in which the gear pump mechanism within the first pump case comprises:

a driving gear provided on the periphery of the driving shaft; and two driven gears provided within the first pump case for being engaged with the driving gear.

5. The non-stage transmission of claim 1, in which the gear pump mechanism within the second pump case comprises:

a driving gear provided on the periphery of the driven shaft; and two driven gears provided within the second pump case, the driven gears being engaged with the driving gear.

6. A non-stage transmission comprises:

a housing for storing hydraulic fluid therein; a driving shaft provided in the housing;

a driven shaft provided in the housing in a coaxial position with the driving shaft and functioning as a pump shaft;

a first pump case rotatably provided on the driving shaft, the first pump case encasing a portion of the driven shaft and having at least one fluid intake port and a fluid discharge port for allowing circulation of the hydraulic fluid through the first pump case;

a second pump case fixed on the housing and opposed to the first pump case, the second pump case encasing a portion of the driven shaft and having at least one fluid intake port and a fluid discharge port for allowing circulation of the hydraulic fluid through the second pump case;

an automatic fluid circulation regulation mechanism for automatically regulating the circulation of the hydraulic fluid through the fluid intake ports and the fluid discharge ports by closing at least one port of the fluid discharge port and the at least one fluid intake port of the second pump case while opening at least one port of the fluid discharge port and the at least one fluid intake port of the first pump case; and first and second gear pump mechanisms provided within the first and the second pump cases, respectively, in which an increasing load applied to the driven shaft causes the automatic fluid circulation regulation mechanism to reduce the hydraulic fluid circulation through the first gear pump mechanism.

* * * * *